United States Patent [19]

Henry et al.

[11] Patent Number: 5,978,517
[45] Date of Patent: Nov. 2, 1999

[54] DIGITAL IMAGE PROGRESSIVE TRANSMISSION

[75] Inventors: Félix Henry, Rennes; Claude Dierieck, Cesson Sevigne, both of France

[73] Assignee: Canon Kabushiki Kaisha, Tokyo, Japan

[21] Appl. No.: 08/877,837

[22] Filed: Jun. 16, 1997

[30] Foreign Application Priority Data

Jun. 21, 1996 [FR] France .................................. 96 07770

[51] Int. Cl.$^6$ .............................. G06K 9/30; G06K 9/46; G06K 9/38
[52] U.S. Cl. .......................... 382/253; 382/240; 382/232; 382/239
[58] Field of Search .................................... 382/232, 235, 382/240, 253; 358/428, 432, 539, 426; 348/384, 390, 408, 414, 417, 418, 422

[56] References Cited

U.S. PATENT DOCUMENTS 5,247,357  9/1993  Israelsen .................................. 358/133
5,313,534  5/1994  Burel ....................................... 382/253

FOREIGN PATENT DOCUMENTS 0288963  11/1988  European Pat. Off. .

OTHER PUBLICATIONS

Pratt, Digital Image Processing, Chapter 23, "Digital Spatial Processing Image Coding", pp. 662–66 and 707 (1978).
Netravali, A. et al. "Picture Coding: A Review", Proceedings of the IEEE, vol. 68, No. 3, pp. 366–407 (Mar. 1980).
Arnold, L. "Interpolative Coding of Images with Temporally Increasing Resolution", Signal Processing 17, pp. 151–60, Elsevier Science Publishers, B.V. (1989).
Netravali, et al. "Digital Pictures", pp. 468–73 (1988).
Hartwig, S. et al. Digitale Bildcodierung (Teil 10) Vektorquantisierung, Fernseh–Und Kino–Technik, 46 Jahrgang, Nr. 11, pp. 763–75 (1992).
Poggi, G. "Applications of the Kohonen Algorithm in Vector Quantization", Eur. Trans. on Telecom. & Rel. Techn., No. 2, pp. 191–202 (Mar./Apr. 1992).
W.B. Pennebaker and J.L. Mitchell, JPEG still image data com,pression standard, Van Nostrand Reinhold, N.-Y., pp. 86–89,92, 1993.

*Primary Examiner*—Bijan Tadayon
*Assistant Examiner*—Dmitry A. Novik
*Attorney, Agent, or Firm*—Fitzpatrick, Cella, Harper & Scinto

[57] ABSTRACT

In order to progressively transmit a digital image (IM), a method for coding the image comprises the division (E1) of the image into vectors ($V_{m,n}$), the selection (E2) of a code vector ($VC_d$) associated with an index ($A_d$) for each of the image vectors, and the replacement (E2) of the image vectors by the indices associated with the selected code vectors, in order to produce a plane of indices (PI) representing the image. The method comprises the steps of sub-sampling (E3) the plane of indices (PI) into sub-planes of indices ($SPI_1$ to $SPI_F$) respectively comprising indices selected from the plane of indices, and ordering (E4) the sub-planes of indices according to a predetermined order before transmitting them.

17 Claims, 9 Drawing Sheets

DIGITAL IMAGE PROGRESSIVE TRANSMISSION

The present invention concerns the progressive transmission of a digital image compressed by vectorial quantization.

A conventional digital image is a matrix of for example 512 by 512 pixels coded over eight bits. The transmission of such an image over a low-speed channel requires several tens of minutes. Image compression techniques have been developed to reduce transmission time.

Among these techniques, compression by vectorial quantization is well suited to image transmission since it offers a high compression ratio whilst preserving good image quality. The image is first divided into vectors which are blocks of adjacent pixels. Each vector is compared with predetermined code vectors contained in a code book. An index is associated with each code vector. The image vectors are respectively replaced by the indices of the code vectors which most resemble them. The set of indices is a compressed form of the initial image.

Moreover, progressive image transmission allows an approximate version of the transmitted image to be constructed in the course of transmitting the image. The approximate version is constructed from the data already received without waiting for all the data relating to the image to have been transmitted. The received image is gradually improved as the data are transmitted.

Progressive transmission allows a user to quickly display the approximate version of the image. The user can interrupt the transmission in progress if the approximate version of the image is sufficient or on the contrary if the image is not the one desired.

In order to make the most of the advantages of vectorial quantization and progressive transmission, it is desirable to combine these two techniques, as appears for example in document WO-A-93/10624.

However, the inventors have found that in practice early recognition of the transmitted image is not always easy and it is necessary to wait before being able to make use of the transmitted image. Furthermore, although the quality of the transmitted image is generally satisfactory for a grey scale image, this is not always the case for a colour image. In particular, the colours are not properly restored at the start of transmission. The chrominances space is not ordered and a quantification performed with few code vectors at the start of progressive transmission, that is to say a coarse quantification, as according to the prior art, causes significant differences of chrominance and therefore of colour in the restored image. The colour restoration is thus coarse at the start of transmission and improves gradually during the progressive transmission. These colour differences are very intrusive visually and prevent early recognition of the transmitted image.

The present invention aims to remedy these disadvantages by providing an image coding method which improves the early recognition of the image both for a grey scale image and for a colour image.

To this end, the invention proposes a method for coding a digital image, comprising the steps of:
 dividing the image into vectors of predetermined size,
 selecting a code vector from a code book for one of the image vectors, each of the said code vectors being associated with an index,
 replacing the said one of the image vectors by the index associated with the selected code vector, and
 repeating the selection and replacement steps for all the image vectors in order to produce a plane of indices representing the image, composed of lines and columns of indices, characterised in that it comprises the steps of:
 sub-sampling the said plane of indices into a predetermined number of sub-planes of indices respectively comprising indices selected from the plane of indices, and
 ordering the sub-planes of indices according to a predetermined order.

Correlatively, the invention proposes a digital image coding device, having:
 a means for dividing the image into vectors of predetermined size,
 a means for storing code vectors and respective indices,
 a means for selecting code vectors from the storage means for the image vectors, respectively, and for replacing the image vectors by the indices of the respective selected code vectors, in order to produce a plane of indices composed of lines and columns of indices,
characterised in that it has
 a means for sub-sampling the said plane of indices into a predetermined number of sub-planes of indices respectively comprising indices selected from the plane of indices, and
 a means for ordering the sub-planes of indices according to a predetermined order.

The coding method and device are suited both to a grey scale image and a colour image. The sub-planes of indices are ordered so as to allow a rapid reconstruction of the coded image. For a colour image, the colours are properly restored from the start of the progressive transmission.

The sub-sampling and the fact of ordering the sub-planes of indices improve the quality of the reconstructed image during its progressive transmission. Notably, the colours are restored with a greater fidelity than according to the prior art. This is because, unlike the prior art, the invention allows full restoration of the levels of grey or colour from the sub-plane of indices of the image transmitted, at each step of the progressive transmission. By virtue of the invention, information useful for early recognition of the image, such as outlines with low contrast and areas with a small luminance gradient, are easily restored from the start of the progressive transmission.

Advantageously, the sub-planes of indices comprise an equal number of indices equally distributed in the plane of indices. The sub-planes of indices are disjoined two by two and the combination of the sub-planes of indices is equal to the plane of indices. Thus, each sub-plane of indices contains an equal part of the information relating to the image, which subsequently allows the image to be reconstructed. The total quantity of data necessary for reconstruction of the image is not increased because of the progressive transmission.

According to a preferred embodiment, the sub-planes of indices ordered according to the said predetermined order are such that the indices of two successive ordered sub-planes of indices are substantially equally distributed in the plane of indices. For example, a first index of one of the ordered sub-planes of indices is shifted by one line and one column with respect to a second index of an ordered sub-plane of indices adjacent to the said one of the ordered sub-planes of indices. The reconstruction of the image from the sub-planes of indices thus ordered is facilitated, as is the early recognition of the image during the progressive transmission of the latter.

According to a preferred embodiment which is simple to implement, each sub-plane of indices comprises indices selected from the plane of indices according to a first spatial period along the lines of the plane of indices and according to a second spatial period along the columns of the plane of indices.

According to another embodiment, different areas of the image are processed so as to be sub-sampled with respective numbers of sub-planes of indices which are specific to them. The number of sub-planes of indices for an area of the image may notably be a function of the quantity of information contained in the said area. This embodiment allows the sub-sampling to be adapted according to the image.

In another aspect, the invention proposes a method for progressive transmission of a digital image, comprising on the one hand the same steps as the coding method briefly explained above and on the other hand the step for successively transmitting the ordered sub-planes of indices.

To implement the progressive transmission method, the invention also concerns a device for progressive transmission of a digital image, having the same means as the previously explained coding device, and having in addition a means for successively transmitting the ordered sub-planes of indices.

The ordered sub-planes of indices are transmitted to a suitable receiver. The order of the transmitted sub-planes of indices is determined so that the construction of the image from the transmitted sub-planes of indices is efficient, that is to say allows an early recognition of the image in the course of progressive transmission.

In another aspect of the invention, a method for decoding a digital image coded in the form of sub-planes of indices by the coding method according to the invention, the said indices representing vectors of pixels of the image, is characterised in that it comprises the steps of:

constructing a partial image containing vectors identified by the indices of at least one sub-plane of indices, and unknown vectors, estimating the unknown vectors of the partial image by means of the identified vectors, as estimated vectors, and constructing an intermediate image containing the identified vectors and the estimated vectors.

Correlatively, the invention is concerned with a device for decoding a digital image coded in the form of sub-planes of indices, the said indices representing vectors of pixels of the image, characterised in that it has:

a means for constructing a partial image containing vectors identified by the indices of at least one sub-plane of indices, and unknown vectors, a means for estimating the unknown vectors of the partial image by means of the identified vectors, as estimated vectors, and a means for constructing an intermediate image containing the identified vectors and the estimated vectors.

The decoding device implements the decoding method according to the invention.

The decoding device and method enable the advantages of the previously explained coding device and method to be obtained.

Advantageously, the steps of constructing a partial image, estimating the unknown vectors and constructing an intermediate image are repeated for each of the sub-planes of indices, and the partial image constructed at a repetition for one sub-plane of indices contains the vectors of the partial images constructed previously and the vectors identified by the indices of the sub-plane of indices of the repetition. Thus the partial image constructed contains more and more vectors at each repetition and progressively approaches the complete image to be constructed.

According to one characteristic of the invention, the step for constructing a partial image comprises:

constructing a partial plane of indices containing the indices of at least one sub-plane of indices, storing the constructed partial plane of indices, and constructing a partial image containing vectors identified by the indices of the partial plane of indices, and unknown vectors.

The partial plane of indices corresponding to a partial image is stored in order to be used to construct a following partial plane of indices.

Furthermore, the step of estimating the unknown vectors of the partial image comprises:

determining the number of identified vectors respectively adjacent to the unknown vectors, estimating first unknown vectors which have the maximum number of adjacent identified vectors, as estimated vectors, and repeating the steps of determining the number of identified vectors and estimating the first unknown vectors, considering the vectors previously estimated to be identified.

The unknown vectors which have the maximum number of adjacent identified vectors are the most accurately estimated unknown vectors because of the greatest quantity of information available for estimating them.

In practice, the step of estimating the unknown vectors of the partial image comprises:

determining one of the said estimated vectors by maximising the probability of the said estimated vector being adjacent to at least one identified vector.

In another aspect of the invention, a method of receiving a digital image transmitted in the form of successive sub-planes of indices, the said indices representing vectors of pixels of the image, is characterised in that it comprises the steps of:

receiving at least one sub-plane of indices, constructing a partial image containing vectors identified by the indices of the said at least one sub-plane of indices, and unknown vectors, estimating the unknown vectors of the partial image by means of the identified vectors, as estimated vectors, and constructing an intermediate image containing the identified vectors and the estimated vectors.

Correlatively, the invention concerns a device for receiving a digital image transmitted in the form of successive sub-planes of indices, the said indices representing vectors of pixels of the image, characterised in that it has:

a means for receiving at least one sub-plane of indices, a means for constructing a partial image containing vectors identified by the indices of the said at least one sub-plane of indices, and unknown vectors, a means for estimating the unknown vectors of the partial image by means of the identified vectors, and a means for constructing an intermediate image containing the identified vectors and the estimated vectors.

The characteristics and advantages of the present invention will emerge more clearly from a reading of several embodiments illustrated by the accompanying drawings, in which.

Figure 1:
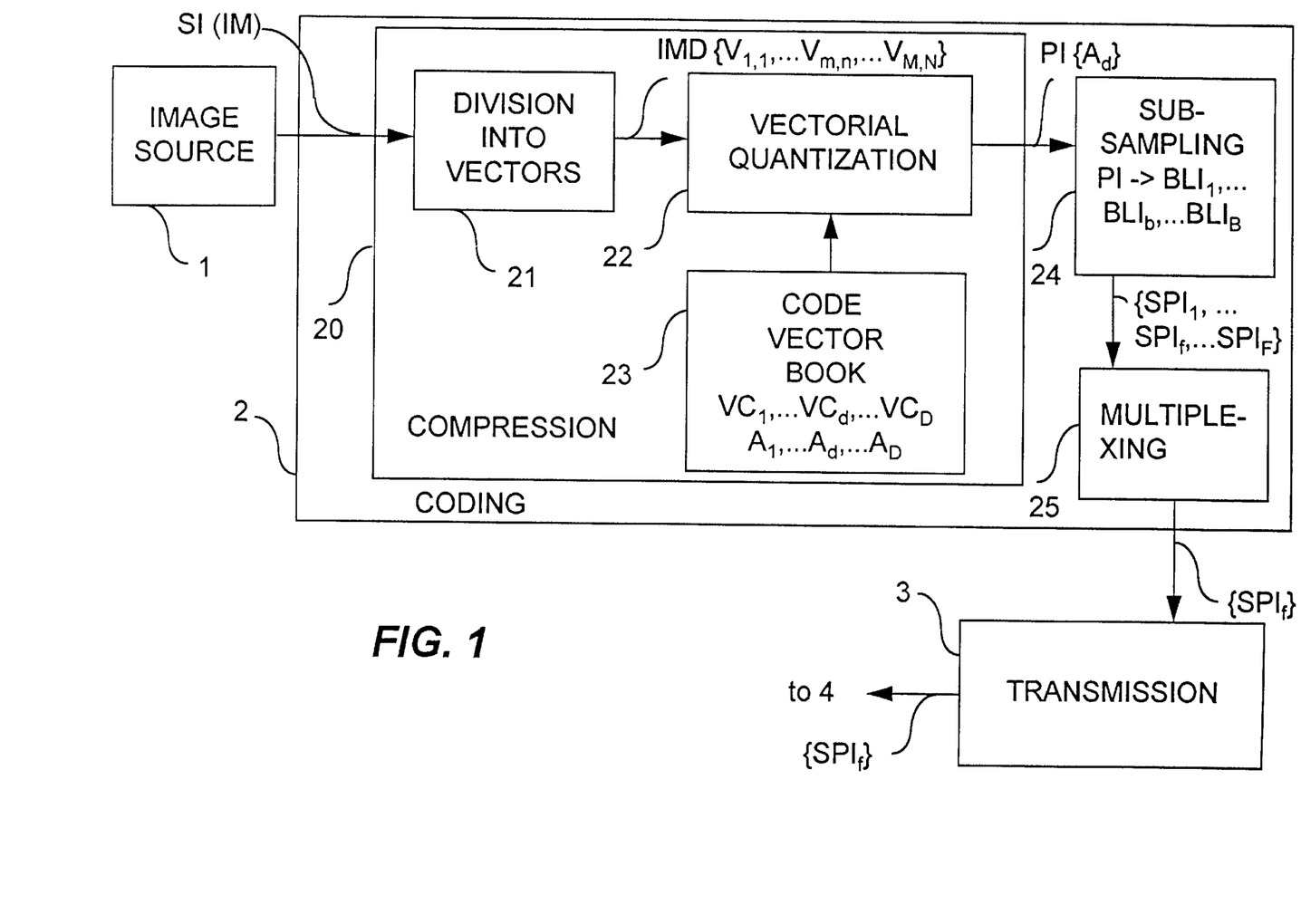
FIG. 1 is a block diagram of an embodiment of a device for the progressive transmission of a digital image according to the invention.

With reference to FIG. 1, a device for the progressive transmission of a digital image according to the invention has an image source 1, an image coder 2 and a transmission circuit 3. The image coder 2 has schematically a data compression circuit 20, a sub-sampling circuit 24 and a multiplexing circuit 25.

The image source 1, the data compression circuit 20 and the transmission circuit 3 are conventional.

The image source 1 is a device for generating a series of digital samples representing an image. The source 1 has an image memory and provides a digital image signal SI to the input of the image coder 2. The image signal SI is a series of digital words, for example bytes. Each byte value represents one pixel of an image IM with 256 grey levels, or black and white image.

Figure 2A:
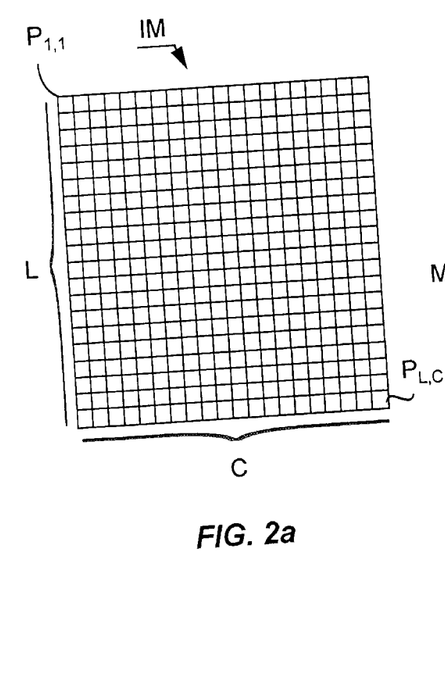
FIG. 2a shows schematically a digital image to be transmitted by the device of FIG. 1.

The image IM shown in FIG. 2a is a matrix with L lines and C columns comprising L.C pixels $P_{1,1}$ to $P_{L,C}$, L and C being integers for example equal to 512. The division circuit 21 divides the image IM by block, or vector, into a divided image IMD shown in FIG. 2b. The image IMD comprises M.N vectors $V_{1,1}$ to $V_{M,N}$, where M and N are integers. Any vector $V_{m,n}$, with m between 1 and M and n between 1 and N, is a rectangular block of adjacent pixels of the image IM. The vector $V_{m,n}$ has a predetermined size, for example 4×4 pixels.

Again with reference to FIG. 1, the data compression circuit 20 has a division circuit 21 from an image digital signal input connected to the image source 1. An output of the division circuit 21 is connected to a first input of a vectorial quantization circuit 22. A code vector book memory 23 has an output connected to a second input of the vectorial quantization circuit 22.

The code vector book memory 23 contains D predetermined code vectors $VC_1$ to $VC_D$ of the same size as the vectors $V_{1,1}$ to $V_{M,M}$, where D is an integer of value for example 256, 512 or 1024. A code vector $VC_d$, with d between 1 and D, is marked with a code vector index or address $A_d$ in the vector book memory 23.

The division circuit 21 provides the divided image IMD in the form of a series of vectors $V_{1,1}$ to $V_{M,N}$ to the vectorial quantization circuit 22. The quantification circuit 22 compares the vector $V_{m,n}$ with all the code vectors $VC_1$ to $VC_D$ in order to identify the code vector most resembling the vector $V_{m,n}$. The comparison is a measurement of distortion in the vector space for example by calculation of the square of the Euclidean distance between the vectors compared. If the code vector $VC_d$ most resembles the vector $V_{m,n}$, the vectorial quantization circuit 22 delivers the index $A_d$ as an output. The image IM is thus compressed into another image PI, a so-called image of indices or plane of indices, containing the indices of the code vectors identified by the quantization circuit 22.

As already stated, the image source 1 and the data compression circuit 20 are conventional.

According to the invention, an output of the vectorial quantization circuit 22 is connected to an input of the sub-sampling circuit 24, an output of which is connected to the multiplexing circuit 25. An output of the multiplexing circuit 25 is connected to the transmission circuit 3.

Figure 3A:
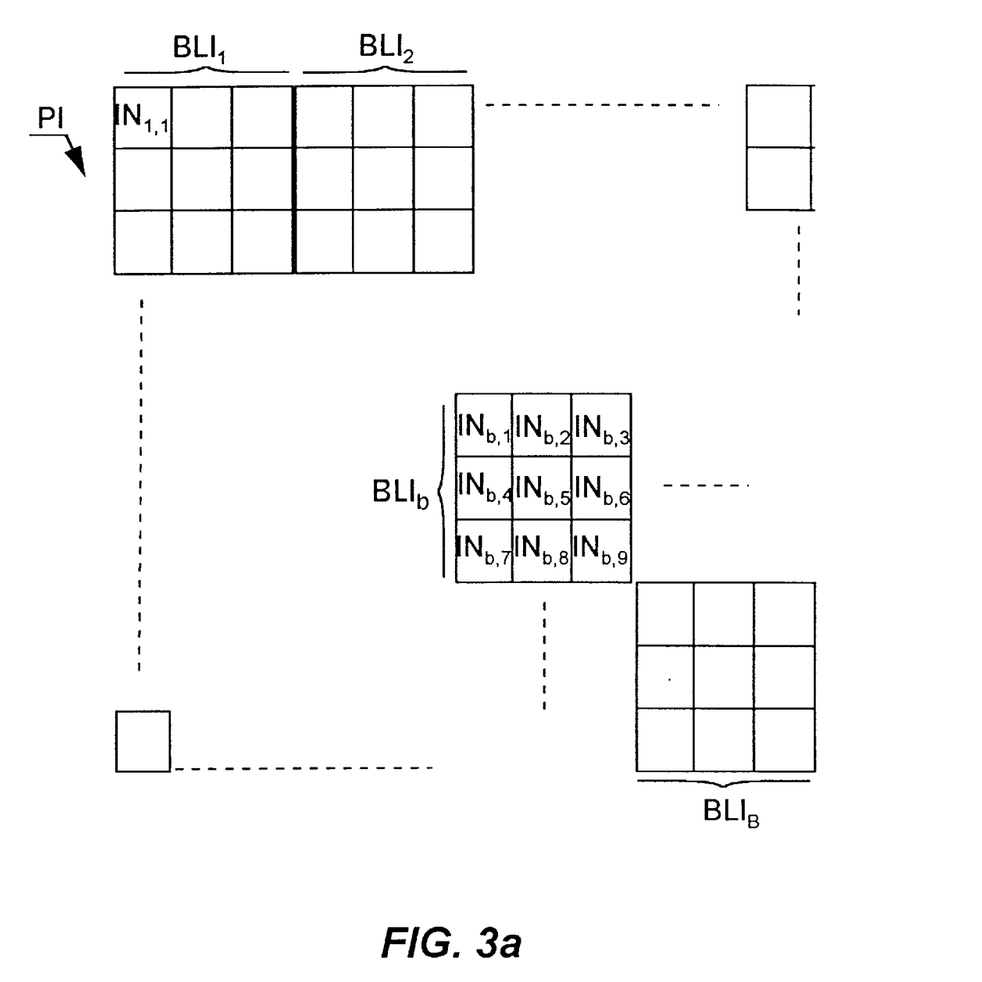
FIG. 3a shows a plane of indices constructed in the device of FIG. 1.

The plane of indices PI is sub-sampled by a predetermined integer factor F by the sub-sampling circuit 24. With reference to FIG. 3a, the factor F is equal to 9. The plane of indices PI is divided into B blocks of indices $BLI_1$ to $BLI_B$, B being an integer. Any block $BLI_b$, with b between 1 and B, is a square block containing nine adjacent indices of the plane of indices PI. For clarity of the description, the indices of the block of indices $BLI_b$ are marked $IN_{b,1}$ to $IN_{b,F}=IN_{b,9}$.

The plane of indices PI is sub-sampled into F=9 sub-planes of indices $SPI_1$ to $SPI_F=SPI_9$. The sub-planes of indices are disjoined two by two and the combination of the sub-planes of indices is equal to the plane of indices.

Figure 3B:
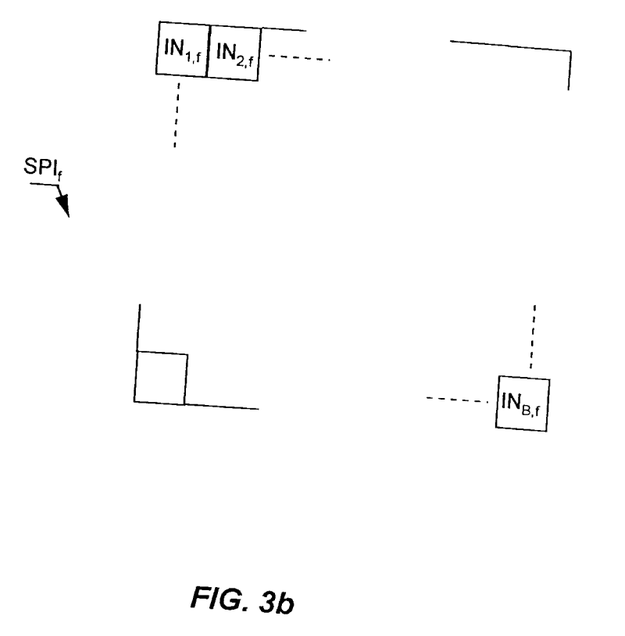
FIG. 3b shows a sub-plane of indices constructed in the device of FIG. 1.

According to FIG. 3b, a sub-plane $SPI_f$, with f an integer between 1 and F, contains the B indices $IN_{1,f}$ to $IN_{B,f}$ of each of the blocks of indices $BLI_1$ to $BLI_B$. In other words, the sub-plane of indices $SPI_f$ contains indices selected according to a first spatial period equal to 3 along the lines of the plane of indices and according to a second spatial period equal to 3 along the columns of the plane of indices. The spatial periods depend on the sub-sampling factor F.

The sub-sampling circuit 24 successively provides the sub-planes of indices $SPI_1$ to $SPI_F=SPI_9$ to the multiplexing circuit 25. For each image, the multiplexing circuit 25 stores the sub-planes of indices and then reorders them according to a predetermined order, for example $SPI_1$, $SPI_5$, $SPI_9$, $SPI_2$, $SPI_6$, $SPI_7$, $SPI_3$, $SPI_4$ and $SPI_8$. As explained later, the order is determined in order to equally distribute the transmitted indices as far as possible, so as to improve the reconstruction of the image during the progressive transmission. The multiplexing circuit 25 provides the reordered sub-planes of indices to the transmission circuit 3.

The transmission circuit 3 transmits in a conventional manner the image coded in the form of reordered sub-planes of indices to a receiving device explained subsequently. The circuit 3 notably has circuits for coding and/or modulation of the signal to be transmitted.

As a variant, the transmission circuit is replaced by a circuit for storing the image coded in the form of reordered sub-planes of indices.

Figure 4:
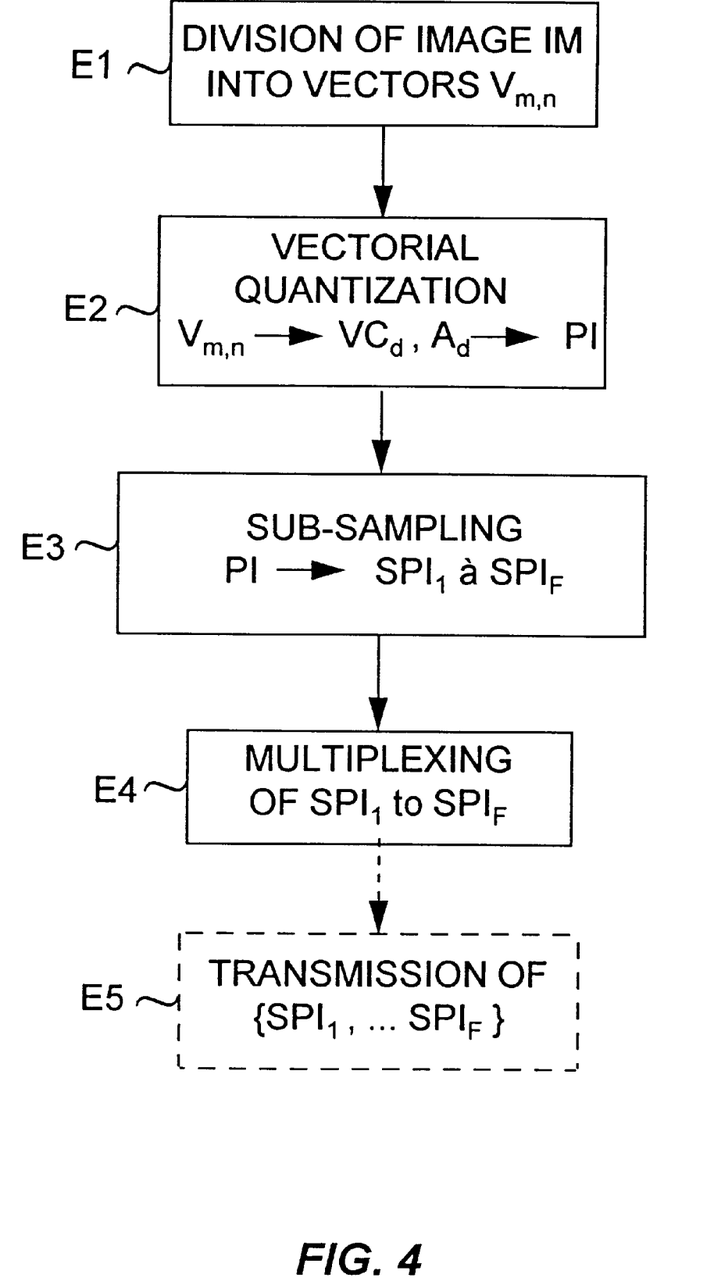
FIG. 4 shows an embodiment of a digital image coding algorithm according to the invention.

With reference to FIG. 4, an image coding algorithm according to the invention comprises four steps E1 to E4 implemented in the coder 2. The algorithm codes the images provided by the image source 1. The coding is performed image by image.

Figure 2B:
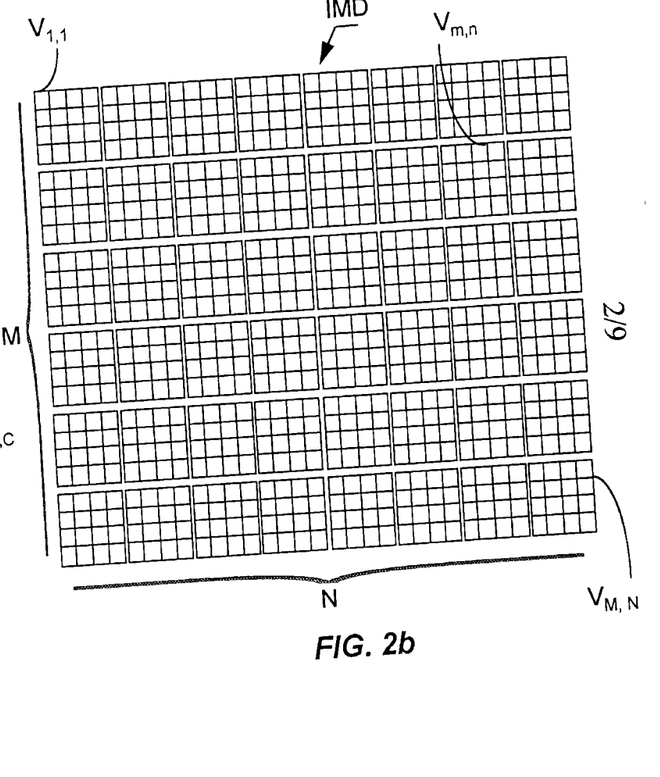
FIG. 2b shows schematically an image divided into vectors in the device of FIG. 1.

The steps E1 and E2 perform the compression of the image IM. At step E1, the image IM is divided into the M.N vectors $V_{1,1}$ to $V_{M,N}$ as shown in FIG. 2b. Step E2 is the vectorial quantization of the vectors $V_{1,1}$ to $V_{M,N}$ of the image IM, using the dictionary 23 of code vectors $VC_1$ to $VC_D$ with which the indices $A_1$ to $A_D$ are respectively associated. The result of step E2 is the plane of indices PI.

The plane of indices PI is sub-sampled at step E3 to produce the F sub-planes of indices $SPI_1$ to $SPI_F$ as shown in FIGS. 3a and 3b.

At step E4, the sub-planes of indices associated with the image IM are multiplexed in order to be reordered according to a predetermined order. The predetermined order corresponds to an order for transmitting the sub-planes of indices. The coding algorithm is followed by a step E5 for transmitting the ordered sub-planes of indices. The transmission is performed in a conventional manner, to a remote receiver. As a variant, the sub-planes of indices ordered at step E4 are stored, for example to be transmitted later.

Figure 5:
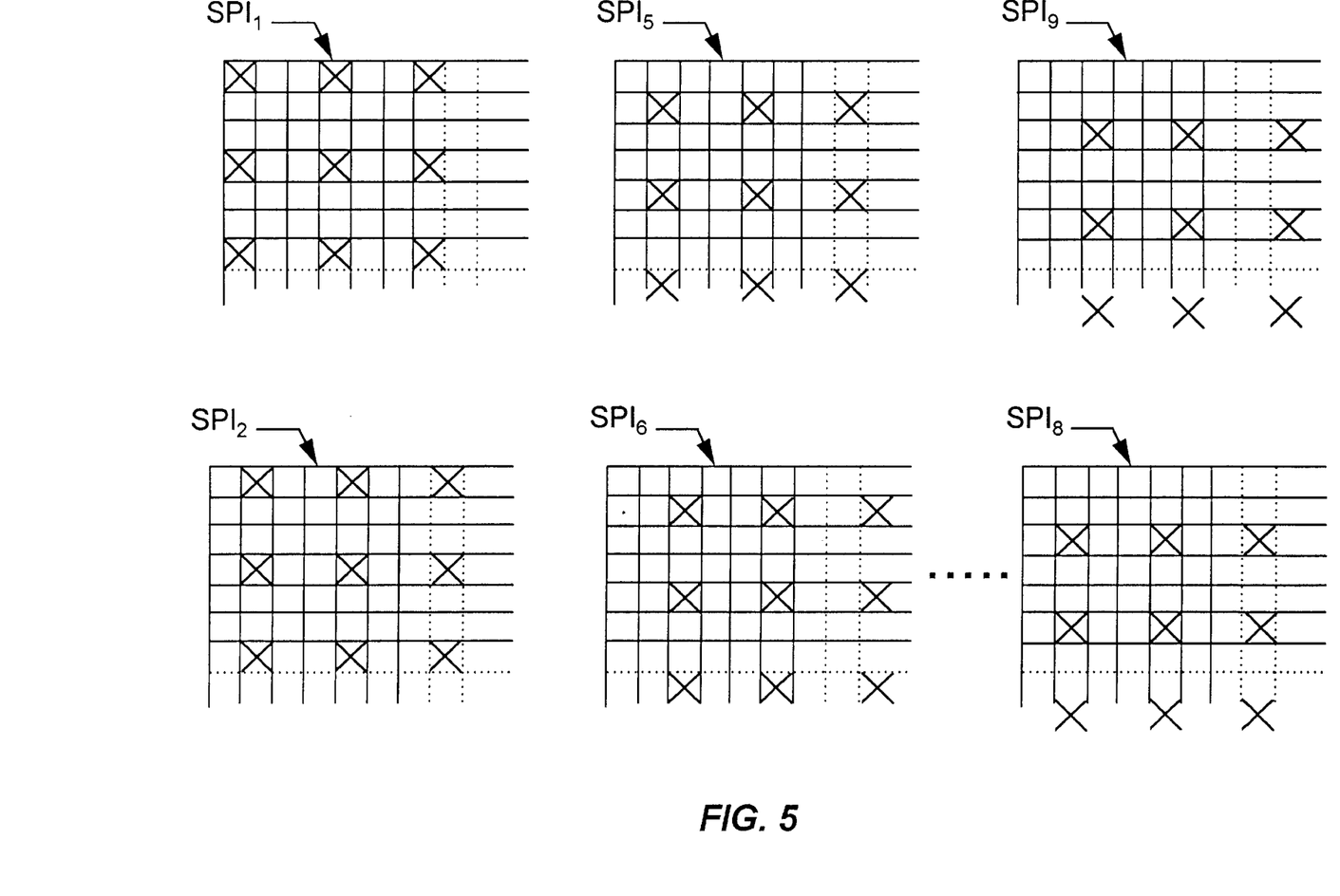
FIG. 5 shows sub-planes of indices ordered according to the invention.

The reordered sub-planes are illustrated in FIG. 5 and are transmitted progressively to an image receiving device explained subsequently. The transmission of a sub-plane is one step of the progressive transmission. At each step of the progressive transmission, a limited number of indices equal to the number of indices in a sub-plane of indices is transmitted and all the information relating to one index, that is to say to one vector of the image, is transmitted.

The first sub-plane transmitted $SPI_1$ contains the left-most and highest index $IN_{1,1}$ to $IN_{B,1}$ of each of the B blocks of indices $BLI_1$ to $BLI_B$ corresponding to the image IM. The second sub-plane transmitted $SPI_5$ contains the nearest index in a downward diagonal direction to each of the indices of the first sub-plane $SPI_1$ and so on. Any index of the sub-plane of indices $SPI_5$ is shifted by one line and one column with respect to an index of the adjacent sub-plane of indices $SPI_1$.

In the example chosen where the blocks of indices $BLI_1$ to $BLI_B$ are squares of nine indices, the sub-planes of indices $SPI_1$, $SPI_5$ and $SPI_9$ define a first group of diagonal lines of the plane of indices PI associated with the image IM. Likewise, the sub-planes of indices $SPI_2$, $SPI_6$ and $SPI_7$ define a second group of diagonal lines of the plane of indices PI. Finally, the sub-planes of indices $SPI_3$, $SPI_4$ and $SPI_8$ define a third and last group of diagonal lines of the plane of indices PI.

The transmission of the sub-planes of indices by reversing the order of the previously defined groups of diagonal lines, for example second, first and then third group, is equivalent to the transmission described.

Likewise, in a given group of diagonal lines, the order of transmission of the sub-planes may be reversed for an equivalent result. Thus a large number of orders of transmission of sub-planes are equivalent.

According to one embodiment variant, the order of progressive transmission of the sub-planes does not correspond to diagonals of the plane of indices, but to a progressive tiling, for example $SPI_1$, $SPI_6$, $SPI_8$, $SPI_2$, $SPI_9$, $SPI_4$, $SPI_5$, $SPI_3$ and $SPI_7$.

For other numbers of sub-planes of indices in the plane of indices, that is to say for other values of F, the order of progressive transmission will be different. In all cases, the order is determined so that the indices transmitted successively are as equally distributed as possible in the plane of indices.

Figure 6:
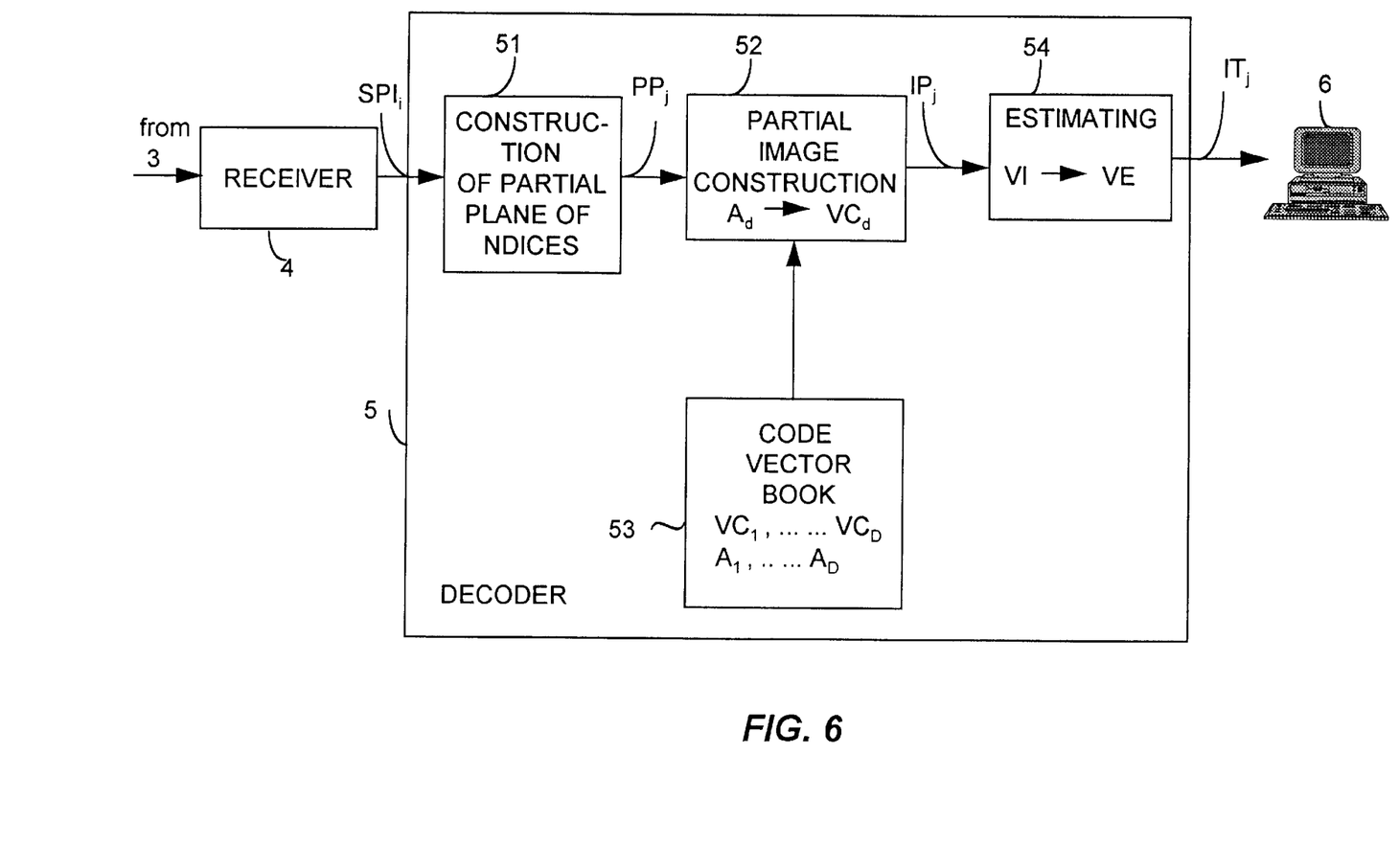
FIG. 6 is a block diagram of an embodiment of a digital image decoding device according to the invention.

With reference to FIG. 6, a receiving device according to the invention receives images coded in the form of sub-planes of indices and transmitted progressively by the device of FIG. 1.

The receiving device has a receiver 4, a decoder 5 and a decoded image utilisation circuit 6, for example a microcomputer provided with an image display screen. The receiver 4 and the decoded image utilisation circuit 6 are conventional.

According to the invention, the decoder 5 has a partial plane of indices construction circuit 51, an output of which is connected to a first input of a partial image construction circuit 52.

The receiver 4 successively applies received sub-planes of indices to the partial plane of indices construction circuit 51. The sub-planes of indices received are assumed to be respectively identical to the sub-planes of indices $SPI_1$ to $SPI_9$ delivered by the multiplexing circuit 25 of the coder 2.

At any step of the progressive transmission of the sub-planes of indices $SPI_1$ to $SPI_9$ corresponding to the image IM, the partial plane of indices construction circuit 51 stores a received sub-plane of indices $SPI_i$, with i an integer between 1 and 9, and constructs a partial plane of indices $PP_j$, with j an integer between 1 and 9, containing the indices of the sub-planes of indices received from the first step of the progressive transmission up to the step under consideration. Thus, at the first progressive transmission step, the partial plane $PP_1$ contains the indices of the first transmitted sub-plane of indices, for example the sub-plane of indices $SPI_1$.

Figure 7:
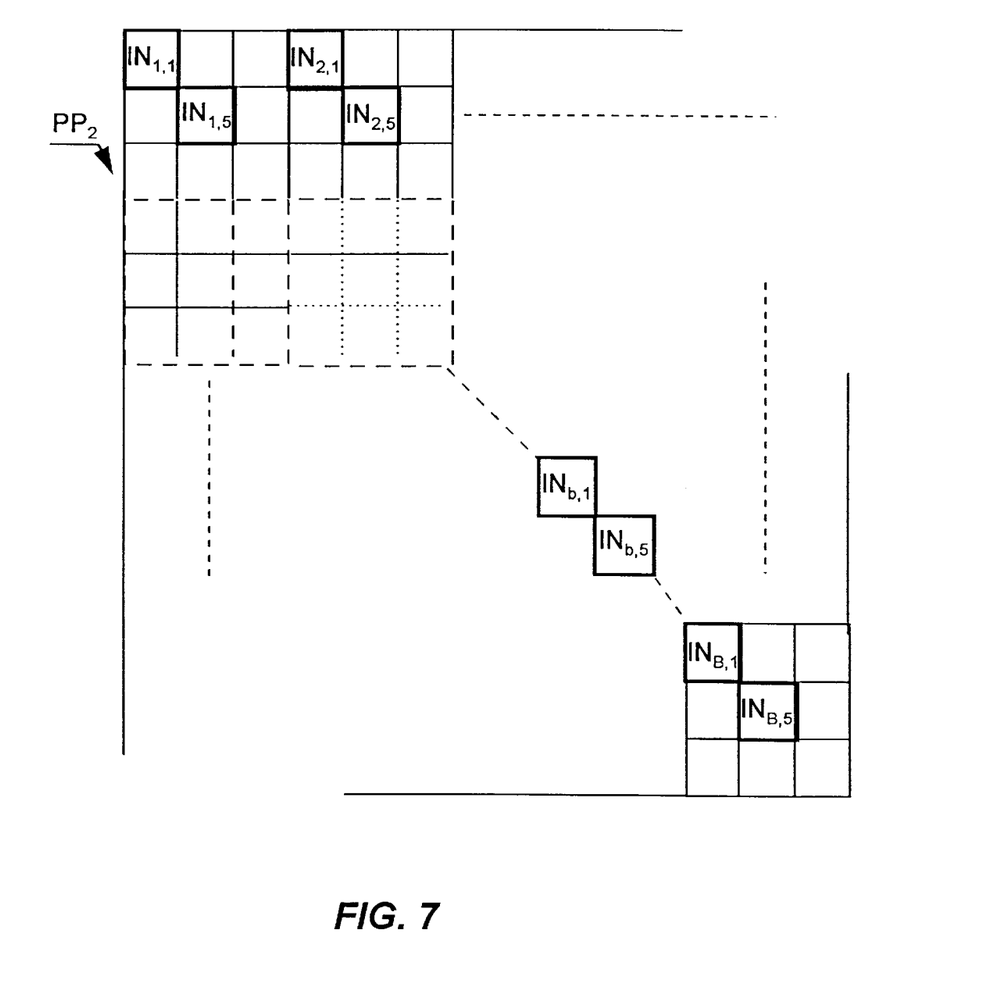
FIG. 7 shows a partial plane of indices constructed in the device of FIG. 6.

As shown in FIG. 7, at the second progressive transmission step, the partial plane of indices $PP_2$ contains the indices of the first two transmitted sub-planes $SPI_1$ and $SPI_5$. The partial plane of indices $PP_2$ contains the pairs of indices $IN_{1,1}$ and $IN_{1,5}$, $IN_{2,1}$ and $IN_{2,5}$ and in general $IN_{b,1}$ and $IN_{b,5}$, up to the pair $IN_{B,1}$ and $IN_{B,5}$. At the ninth progressive transmission step, the partial plane of indices $PP_9$ contains all the indices of the plane PI.

The partial plane of indices construction circuit 51 successively provides the partial planes of indices $PP_1$ to $PP_9$ to the partial image construction circuit 52.

An output of a code vector book 53 is connected to a second input of the partial image construction circuit 52. The code vector book 53 is identical to the code vector book 23 of the coder 2. An output of the partial image construction circuit 52 is connected to an input of a vector estimating circuit 54, an output of which is an output of the decoder 5.

The code vector book 53 contains the code vectors $VC_1$ to $VC_D$ associated with their respective indices $A_1$ to $A_D$. The partial image construction circuit 52 identifies the code vector $VC_d$ corresponding to each of the indices contained in the partial plane of indices $PP_j$ provided by the circuit 51. The identified code vectors are stored and form a partial image $IP_j$ which is provided to the estimating circuit 54.

Thus, for the first partial plane of indices $PP_1$, the circuit 52 identifies and stores the code vectors corresponding to the indices of the partial plane of indices $PP_1$. The identified code vectors determine a first partial image $IP_1$ which contains one ninth of the vectors of the complete image to be reconstituted IR. Then, for the second partial plane of indices $PP_2$, the circuit 52 identifies and stores the code vectors corresponding to the indices of the partial plane of indices $PP_2$. The identified code vectors corresponding to the partial plane of indices $PP_2$ determine a second partial image $IP_2$ which contains two ninths of the vectors of the complete image to be reconstituted IR. Finally, for the ninth partial plane of indices $PP_9$, the circuit 52 identifies and stores the code vectors corresponding to the indices of the partial plane of indices $PP_9$. The identified code vectors corresponding to the partial plane of indices $PP_9$ determine a ninth image $IP_9$ which is the complete image to be reconstituted IR.

The partial image reconstruction circuit 52 successively provides the partial images $IP_1$ to $IP_9$ to the estimating circuit 54. After reception of a partial image $IP_j$, the circuit 54 estimates the vectors of the complete image to be reconstituted IR which are not known according to the partial image $IP_j$ provided by the circuit 52. The circuit 54 then forms an intermediate image $IT_j$ composed of the vectors of the partial image $IP_j$ and the estimated vectors. The intermediate image $IT_j$ is applied to the utilisation circuit 6. A user displays the intermediate image $IT_j$.

Thus, after having received the partial image $IP_1$, the circuit 54 forms an intermediate image $IT_1$ composed of the vectors of the partial image $IP_1$ and estimated vectors. The intermediate image $IT_1$ therefore contains one ninth of the vectors of the complete image IR and eight ninths of estimated vectors. The operation of the estimating circuit 54 is described in more detail subsequently.

Figure 8:
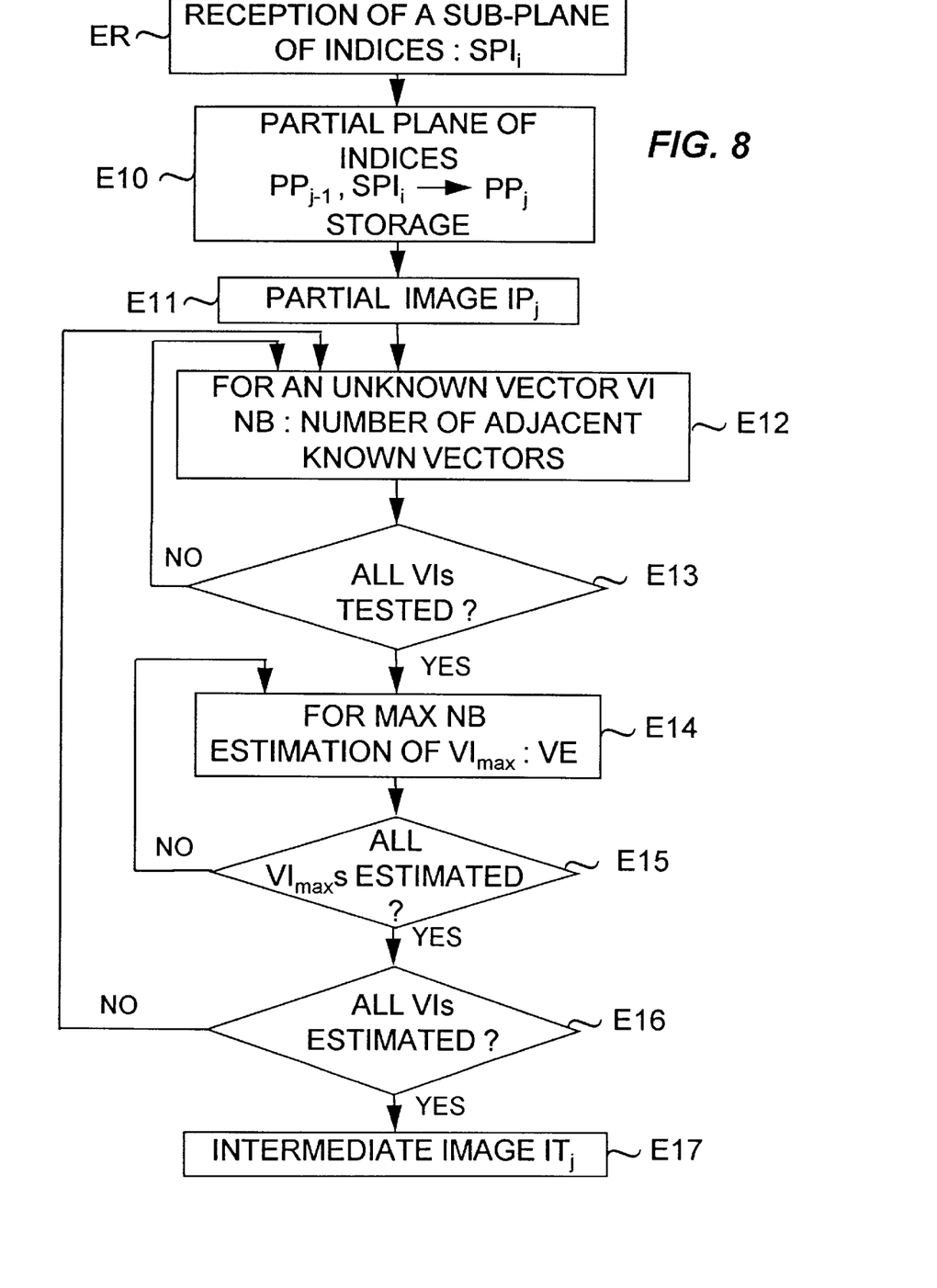
FIG. 8 shows an embodiment of a digital image decoding algorithm according to the invention.

With reference to FIG. 8, an algorithm for decoding an image coded by the algorithm of FIG. 4 comprises eight steps E10 to E17. The steps E10 to E17 are carried out successively for all the received sub-planes of indices $SP_1$, to $SPI_9$ corresponding to the image IM. The decoding algorithm is implemented in the decoder 5 and is preceded by a step ER for receiving a sub-plane of indices which is carried out in the receiver 4. As a variant, the step ER is replaced by the extraction of a sub-plane of indices from a sub-plane of indices memory.

The partial plane of indices $PP_j$ is constructed at step E10. For i equal to 1, the partial plane $PP_1$ contains the indices contained in the first transmitted sub-plane of indices $SPI_1$. For j between 2 and 9, the partial plane of indices $PP_j$ is constructed from the previous plane $PP_{j-1}$, supplemented with the indices of the recently received sub-plane $SPI_i$. The partial plane of indices $PP_j$ is stored.

At step E11, the partial image $IP_j$ is constructed by identifying code vectors stored in the code book memory 53, the indices of which are contained in the partial plane of indices $PP_j$. The partial image $IP_j$ contains known identified vectors and unknown vectors.

An unknown vector VI of the partial image $IP_j$ is adjacent to zero, one, two, three or four known vectors. The number NB of known vectors adjacent to the unknown vector VI is determined at step E12. Step E13 checks whether all the unknown vectors of the partial image $IP_j$ have been tested at step E12. While there remain unknown vectors of which the number of adjacent known vectors is not determined, the algorithm returns to step E12.

When all the unknown vectors have been tested, the algorithm passes to step E14 in order to estimate an unknown vector $VI_{max}$ such that the number NB of known vectors adjacent to the vector $VI_{max}$ is maximum.

The unknown vector $VI_{max}$ is estimated as an estimated vector VE by maximising the probability for the estimated vector to be adjacent to at least one known vector adjacent to the unknown vector $VI_{max}$. The estimated vector VE is selected from a predetermined set of vectors, for example the code book 53. For this, the known-vector pixels which are situated at the boundary between the known vectors adjacent to the unknown vector and the latter are considered and the estimated vector VE is selected so as to minimise the distortion between the "boundary" pixels of the adjacent known vectors and the "boundary" pixels of the estimated vector VE. The choice of the estimated vector VE may be limited to vectors with a variance below a threshold. The estimated vector VE is stored.

Step E15 checks whether all the unknown vectors $VI_{max}$ have been estimated at step E14, and the algorithm returns to step E14 as long as there remain unknown vectors $VI_{max}$ to be estimated.

The algorithm passes to step E16 when all the unknown vectors $VI_{max}$ are estimated. The estimated vectors VE are then considered as known, in the same way as the vectors of the partial image $IP_j$. The algorithm checks at step E16 whether there remain unknown vectors VI to be estimated in the partial image $IP_j$. If all the unknown vectors have not been estimated, the algorithm returns to step E12 and steps E12 to E16 are performed again.

When all the unknown vectors VI have been estimated, the intermediate image $IT_j$ is composed at step E17 with the vectors of the partial image $IP_j$ and the estimated vectors VE.

Steps E10 to E17 are performed for each of the sub-planes of indices $SPI_1$ to $SPI_9$ provided to the decoder 5.

The invention has been described for a grey scale image; as a variant, the invention applies to a digital colour image. The colour image is a set of pixels respectively defined by their red, green and blue components. Each colour component of a pixel is a binary word, for example a byte. The colour image thus has a structure analogous to three grey scale images. The colour image is coded by three parallel coders, analogous to the coder 2 each receiving one component of the colour image. Each component is quantified vectorially. Code vector books specific to each component are used to produce the respective planes of indices, which are then sub-sampled into multiplexed sub-planes of indices.

Likewise, the sub-planes of indices relating to each of the colour image components are decoded by three parallel decoders analogous to the decoder 5.

According to another variant, the colour image is defined by its luminance and its chrominance. The luminance component and the two chrominance components are coded in parallel by three coders analogous to the coder 2, each having its own code vector book. Preferably, the code vector book for the luminance has a size greater than that of the books for the chrominance. Thus, the luminance component is less compressed than the chrominance components. The quality perceived by the human eye is improved when the image is restored.

The sub-planes of indices relating to each of the luminance and chrominance components of the colour image are decoded by three parallel decoders analogous to the decoder 5.

The invention also applies to other types of colour image, for example defined by components of intensity, hue and saturation.

Of course, the present invention is in no way limited to the embodiments described and shown, but, on the contrary, includes any variant within the capability of the man skilled in the art.

For example, the sub-sampling is not necessarily uniform for the whole image, as in the embodiment described previously. Several areas of the image may be sub-sampled according to their own spatial periods along the lines and columns of the plane of indices, such periods being capable of differing from one area to another.

In this embodiment, the image is first divided into sub-images disjoined two by two, the combination of which forms the initial image. Each sub-image is quantified into a plane of indices, then sub-sampled into sub-planes of indices as an independent image, with a number of sub-planes of indices which is specific to it and which may be different from those of the other sub-images of the image.

According to a first variant which is simple to implement, the number of sub-planes of indices of a sub-image is predetermined according to the location of the sub-image in the image. Thus, assuming that most images contain more information in a central area of the image than in peripheral areas, the number of sub-planes of indices of sub-images situated at the centre of the image is smaller than that of sub-images at the edge of the image. A small number of sub-planes of indices corresponds to small spatial periods along the lines and columns of the plane of indices, and each sub-plane of indices thus contains a large number of indices.

According to a more effective second variant, the number of sub-planes of indices of each sub-image is determined in an adaptative manner according to the quantity of information of the sub-image under consideration.

In both cases, the sub-planes of indices of all the sub-images of the image under consideration are reordered before being transmitted so that the indices transmitted are equally distributed over the whole image, rather than only sub-image by sub-image, so as to facilitate the early recognition of the image in its totality.

The decoding of an image coded according to this embodiment is analogous to that previously described. One area of the transmitted image is reconstructed all the more quickly since the number of sub-planes of indices which are assigned to it is small. The area under consideration is thus more quickly recognisable during the progressive transmission.

We claim:

1. Method for coding a digital image (IM), comprising the steps of:
   dividing (E1) the image (IM) into vectors ($V_{1,1}$ to $V_{M,N}$) of predetermined size,
   selecting (E2) a code vector ($VC_d$) from a code vector book (23) for one of the image vectors ($V_{m,n}$), each of the said code vectors being associated with an index ($A_d$),
   replacing (E2) the said one of the image vectors ($V_{m,n}$) by the index ($A_d$) associated with the selected code vector ($VC_d$), and
   repeating the selection and replacement steps for all the image vectors in order to produce a plane of indices (PI) representing the image, composed of lines and columns of indices, characterised in that it comprises the steps of:
      sub-sampling (E3) the said plane of indices (PI) into a predetermined number (F) of sub-planes of indices ($SPI_1$ to $SPI_F$) respectively comprising indices selected from the plane of indices, and
      ordering (E4) the sub-planes of indices ($SPI_1$ to $SPI_F$) according to a predetermined order.

2. Method of progressive transmission of a digital image, comprising the steps of:
   dividing (E1) the image (IM) into vectors ($V_{1,1}$ to $V_{M,N}$) of predetermined size,
   selecting (E2) a code vector ($VC_d$) from a code vector book (23) for one of the image vectors ($V_{m,n}$), each of the said code vectors being associated with an index ($A_d$),
   replacing (E2) the said one of the image vectors by the index associated with the selected code vector, and
   repeating the selection and replacement steps for all the image vectors ($V_{1,1}$ to $V_{M,N}$) in order to produce a plane of indices (PI) representing the image, composed of lines and columns of indices,
characterised in that it comprises the steps of:
   sub-sampling (E3) the said plane of indices (PI) into a predetermined number of sub-planes of indices ($SPI_1$ to $SPI_F$) respectively comprising indices selected from the plane of indices,
   ordering (E4) the sub-planes of indices according to a predetermined order, and
   successively transmitting (E5) the ordered sub-planes of indices.

3. Method according to claim 1 or 2, characterised in that the sub-planes of indices ($SPI_1$ to $SPI_F$) comprise an equal number of indices equally distributed in the plane of indices (PI).

4. Method according to any one of claims 1 or 2, characterised in that the said predetermined order is such that the indices of two successive ordered sub-planes of indices are equally distributed in the plane of indices.

5. Method according to claim 4, characterised in that the sub-planes of indices ordered according to the said predetermined order are such that a first index of one of the ordered sub-planes of indices is shifted by one line and one column with respect to a second index of an ordered sub-plane of indices adjacent to the said one of the ordered sub-planes of indices.

6. Method according to any one of claims 1 or 2, characterised in that the sub-planes of indices ($SPI_1$ to $SPI_F$) are disjoined two by two and the combination of the sub-planes of indices is equal to the plane of indices.

7. Method according to any one of claims 1 or 2, characterised in that each sub-plane of indices ($SPI_1$ to $SPI_F$) comprises indices selected from the plane of indices according to a first spatial period along the lines of the plane of indices and according to a second spatial period along the columns of the plane of indices.

8. Method according to any one of claims 1 or 2, characterised in that different areas of the image are processed so as to be sub-sampled with respective numbers of sub-planes of indices which are specific to them.

9. Digital image coding device, having:
   a means (21) for dividing the image (IM) into vectors ($V_{1,1}$ to $V_{M,N}$) of predetermined size,
   a means (23) for storing code vectors ($VC_1$ to $VC_D$) and respective indices ($A_1$ to $A_D$),
   a means (22) for selecting code vectors ($VC_d$) from the storage means (23) for the image vectors, respectively, and for replacing the image vectors by the indices of the respective selected code vectors, in order to produce a plane of indices (PI) composed of lines and columns of indices,
characterised in that it has:
   a means (24) for sub-sampling the said plane of indices into a predetermined number (F) of sub-planes of indices ($SPI_1$ to $SPI_F$) respectively comprising indices selected from the plane of indices, and
   a means (25) for ordering the sub-planes of indices ($SPI_1$ to $SPI_F$) according to a predetermined order.

10. Device for the progressive transmission of a digital image, having:
    a means (21) for dividing the image (IM) into vectors ($VI_{1,1}$ to $V_{M,N}$) of predetermined size,
    a means (23) for storing code vectors ($VC_1$ to $VC_D$) and respective indices ($A_1$ to $A_D$),
    a means (22) for selecting code vectors from the storage means for the image vectors, respectively, and for replacing the image vectors by the indices of the respective selected code vectors, in order to produce a plane of indices (PI) composed of lines and columns of indices,
characterised in that it has:
    a means (24) for sub-sampling the said plane of indices (PI) into a predetermined number of sub-planes of indices ($SPI_1$ to $SPI_F$) respectively comprising indices selected from the plane of indices,
    a means (25) for ordering the sub-planes of indices according to a predetermined order, and
    a means (3) for successively transmitting the ordered sub-planes of indices.

11. Method for decoding a digital image coded in the form of sub-planes of indices ($SPI_1$ to $SPI_F$), the said indices representing vectors of pixels of the image, characterised in that it comprises the steps of:
    constructing (E10, E11) a partial image ($IP_j$) containing vectors identified by the indices of at least one sub-plane of indices ($SPI_j$), and unknown vectors (VI), estimating (E12 to E16) the unknown vectors of the partial image by means of the identified vectors, as estimated vectors (VE), and constructing (E17) an intermediate image ($IT_j$) containing the identified vectors and the estimated vectors (VE).

12. Method for receiving a digital image transmitted in the form of successive sub-planes of indices, the said indices representing vectors of pixels of the image, characterised in that it comprises the steps of:

receiving (ER) at least one sub-plane of indices ($SPI_i$), constructing (E11) a partial image ($IP_j$) containing vectors identified by the indices of the said at least one sub-plane of indices, and unknown vectors (VI), estimating (E12 to E16) the unknown vectors of the partial image by means of the identified vectors, as estimated vectors (VE), and constructing (E17) an intermediate image ($IT_j$) containing the identified vectors and the estimated vectors (VE).

13. Method according to claim 11 or 12, characterised in that the steps of constructing (E10, E11) a partial image, estimating (E12 to E16) the unknown vectors and constructing (E17) an intermediate image are repeated for each of the sub-planes of indices ($SPI_i$), and in that the partial image ($IP_j$) constructed at a repetition for one sub-plane of indices contains the vectors of the partial images constructed previously and the vectors identified by the indices of the sub-plane of indices of the repetition.

14. Decoding method according to any one of claims 11 or 12, characterised in that the step of constructing (E10, E11) a partial image ($IP_j$) comprises:

constructing (E10) a partial plane of indices ($PP_j$) containing the indices of at least one sub-plane of indices, storing (E10) the constructed partial plane of indices, and constructing (E11) a partial image ($IP_j$) containing vectors identified by the indices of the partial plane of indices ($PP_j$), and unknown vectors (VI).

15. Method according to any one of claims 11 or 12, characterised in that the step of estimating (E12 to E16) the unknown vectors (VI) of the partial image ($IP_j$) comprises:

determining (E12, E13) the number (NB) of identified vectors respectively adjacent to the unknown vectors (VI), estimating (E14, E15) first unknown vectors ($VI_{max}$) which have the maximum number of adjacent identified vectors, as estimated vectors (VE), and repeating (E16) the steps of determining the number of identified vectors and estimating the first unknown vectors, by considering the vectors estimated previously to be identified.

16. Device for decoding a digital image coded in the form of sub-planes of indices ($SPI_1$ to $SPI_F$), the said indices representing vectors of pixels of the image, characterised in that it has:

a means (51, 52, 53) for constructing a partial image ($IP_j$) containing vectors identified by the indices of at least one sub-plane of indices ($SPI_i$), and unknown vectors (VI), a means (54) for estimating the unknown vectors (VI) of the partial image by means of the identified vectors, as estimated vectors (VE), and a means (54) for constructing an intermediate image ($IT_j$) containing the identified vectors and the estimated vectors.

17. Device for receiving a digital image transmitted in the form of successive sub-planes of indices, the said indices representing vectors of pixels of the image, characterised in that it has:

a means (4) for receiving at least one sub-plane of indices, a means (51, 52, 53) for constructing a partial image ($IP_j$) containing vectors identified by the indices of the said at least one sub-plane of indices, and unknown vectors (VI), a means (54) for estimating the unknown vectors of the partial image by means of the identified vectors, as estimated vectors, and a means (54) for constructing an intermediate image ($IT_j$) containing the identified vectors and the estimated vectors.

* * * * *